United States Patent [19]

Vyse et al.

[11] 4,171,559

[45] Oct. 23, 1979

[54] METHOD OF MAKING CONNECTIONS IN PNEUMATIC AND HYDRAULIC SYSTEMS AND TESTING SUCH SYSTEMS

[75] Inventors: Gerrard N. Vyse, Bedford; Horise M. Cooke, Weatherford, both of Tex.

[73] Assignee: Stratoflex, Inc., Fort Worth, Tex.

[21] Appl. No.: 869,464

[22] Filed: Jan. 16, 1978

Related U.S. Application Data

[62] Division of Ser. No. 734,462, Oct. 21, 1976, Pat. No. 4,089,549.

[51] Int. Cl.² ............................................. F16L 35/00
[52] U.S. Cl. ..................................... 29/407; 29/469; 29/705; 285/137 R
[58] Field of Search .......... 29/407, 469, 705, 157.3 C, 29/157.4; 285/137 R, 308, 93; 137/271; 73/46, 49.8

[56] References Cited

U.S. PATENT DOCUMENTS

| | | | |
|---|---|---|---|
| 2,447,185 | 8/1948 | Keim | 285/137 R |
| 3,282,612 | 11/1966 | Younger | 285/137 R |
| 3,290,763 | 12/1966 | Zahuranec et al. | 29/407 |
| 3,469,863 | 9/1969 | Riester et al. | 285/137 R |
| 3,512,808 | 5/1970 | Graham | 285/189 |
| 3,929,356 | 12/1975 | DeVincent et al. | 285/305 |
| 3,933,379 | 1/1976 | Pontigny | 285/137 R |

*Primary Examiner*—Milton S. Mehr
*Attorney, Agent, or Firm*—Merriam, Marshall & Bicknell

[57] ABSTRACT

This disclosure deals with apparatus and method for simultaneously making a plurality of connections between different pneumatic or hydraulic systems, or between parts of each systems, and for testing such systems. The systems, or parts thereof, include groups of hose fittings, and the apparatus includes two or more sub-assemblies and a central connecting member. Each sub-assembly is releasably attached to the fittings of a group, and all of the sub-assemblies are then secured to the central connecting member to form a complete assembly. The central connecting member has a plurality of fluid passages formed therein which interconnect the fittings, thus forming fluid connections between the systems or parts thereof. The passages in the connecting member may also be arranged to interconnect fittings of a single group. Each sub-assembly may be separately used to test the system, or part thereof, associated with the fittings attached to it.

8 Claims, 10 Drawing Figures

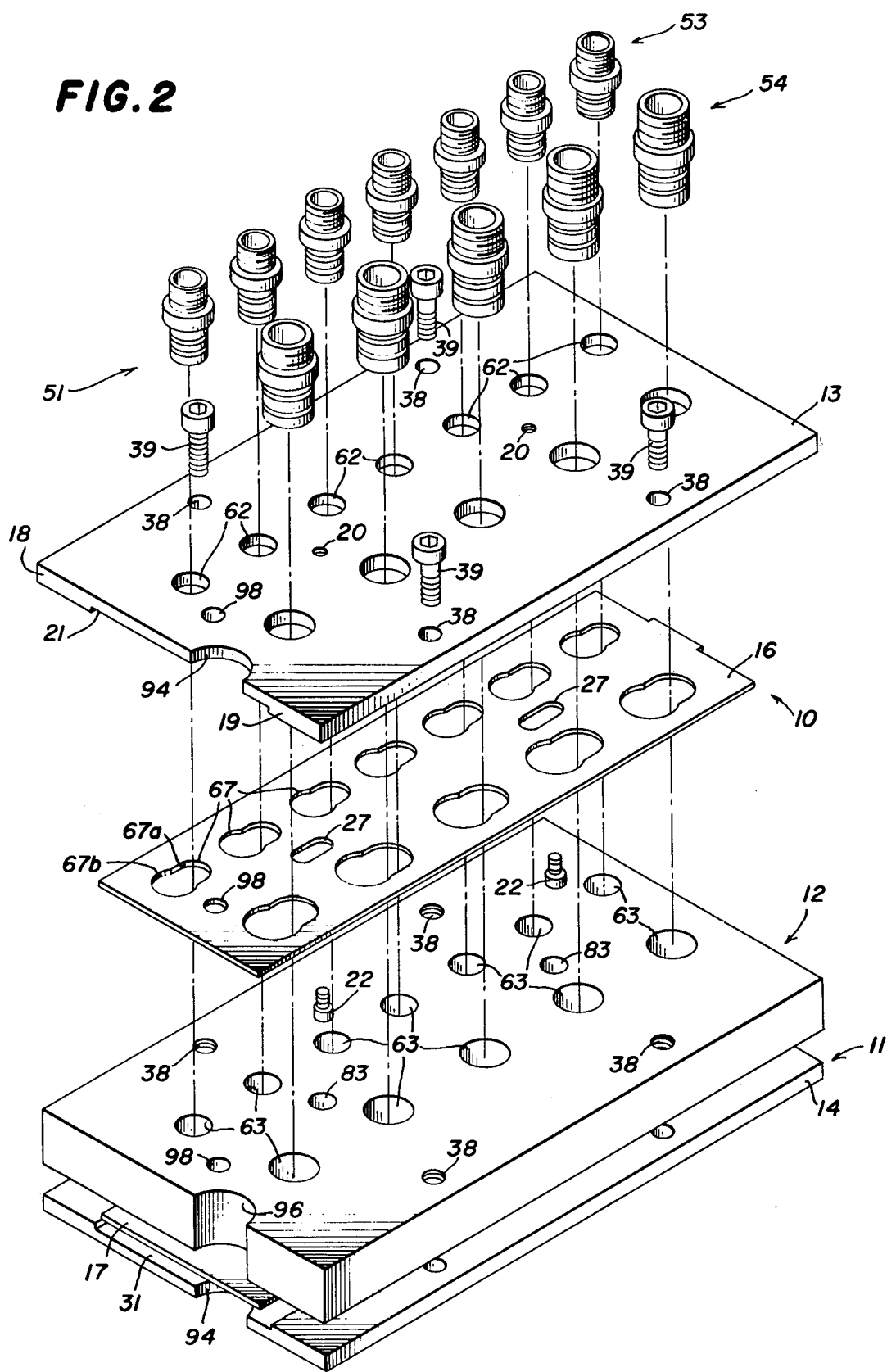

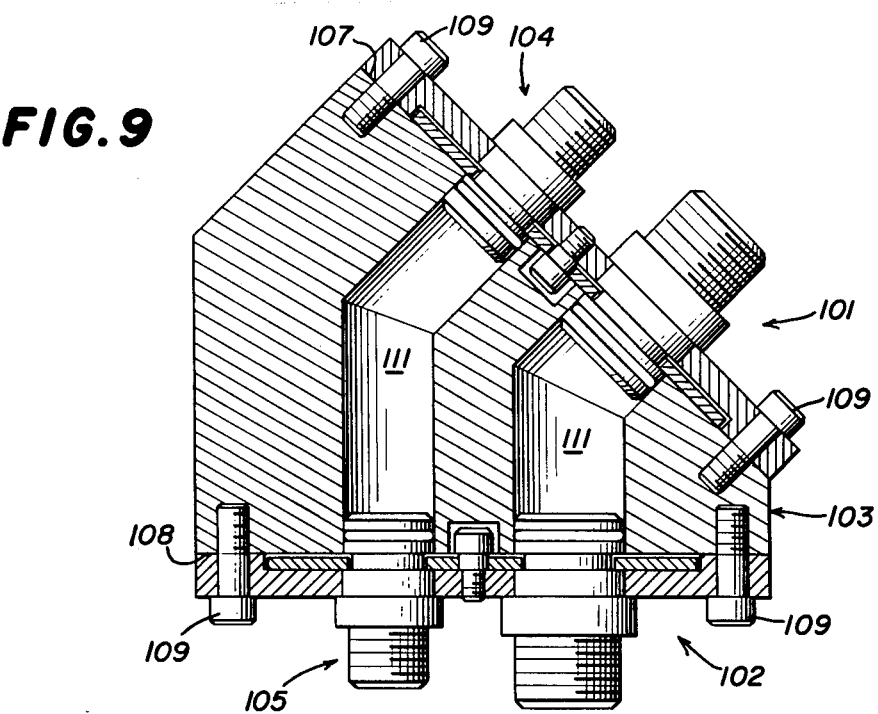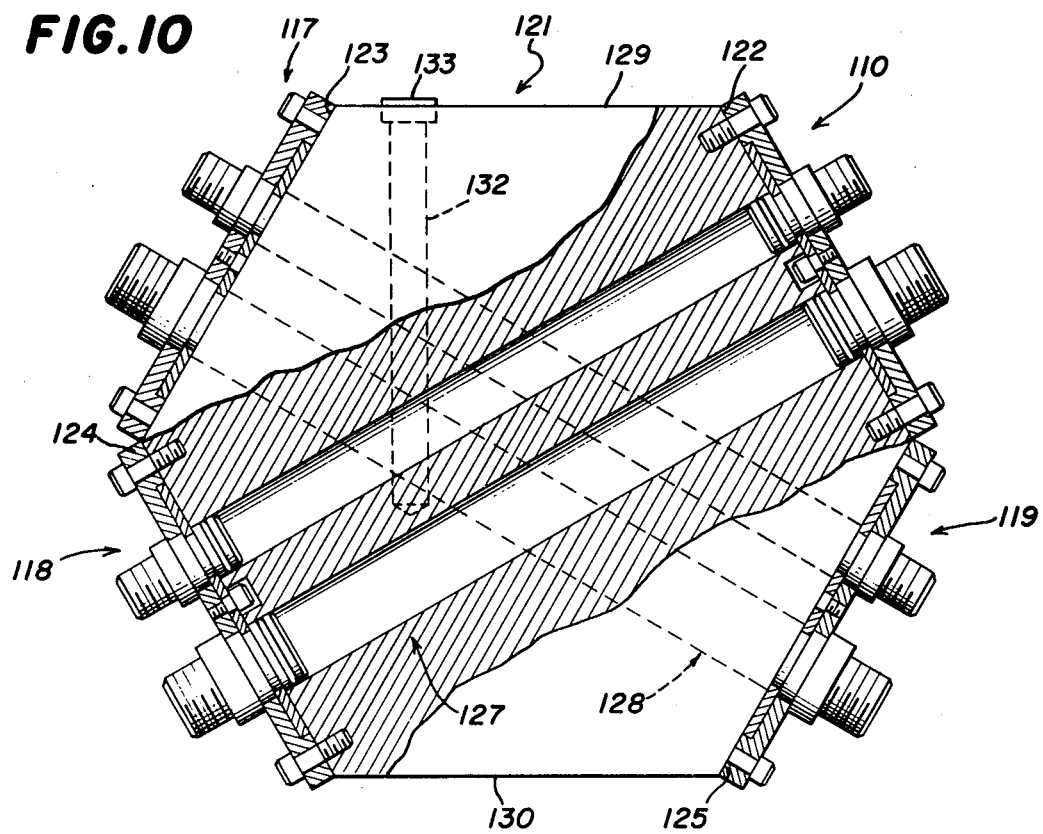

METHOD OF MAKING CONNECTIONS IN PNEUMATIC AND HYDRAULIC SYSTEMS AND TESTING SUCH SYSTEMS

This application is a divisional application based on Vyse et al U.S. Ser. No. 734,462, filed Oct. 21, 1976, now U.S. Pat. No. 4,089,549 and entitled Apparatus For Making Connections In Pneumatic And Hydraulic Systems.

When manufacturing or using machines, vehicles or other articles of manufacture including pressurized pneumatic or hydraulic systems, it is often necessary to make connections between two or more of such systems. For example, a common method of manufacturing a truck is to provide one assembly line where the frame and the engine are assembled, and another assembly line where the body or cab, including the operator's controls, are assembled. Each of the assemblies includes parts of air systems, and it is necessary to connect the parts to form a complete air brake system, a brake light system, etc. At the ends of the two assembly lines, a final assembly is made between each body and a frame, and interconnections are made between the parts of the air systems. Making these pneumatic interconnections has proven to be a time consuming, and therefore a costly, procedure. Further, it is also necessary to pressure test the systems, and this can be a time consuming procedure using conventional techniques.

It is therefore a general object of the present invention to provide an improved method for making connections between parts of pneumatic or hydraulic systems.

It is a further object to provide an improved method for testing such systems.

Apparatus for carrying out a method in accordance with this invention comprises at least two sub-assemblies, each of the sub-assemblies including a plate and a retainer. Each plate has a plurality of holes formed therein which are sized to receive a plurality of hose or tube fittings. A retainer is slidably attached to one side of the plate adjacent the holes, and it is movable between a disengaged position where it permits placement of the fittings through the plate holes and an engaged position where it engages the fittings and retains the fittings in the holes. The apparatus further comprises a center member, and the sub-assemblies are attached to the center member. The center member has a plurality of passages therein, and the passages are located to selectively interconnect the fittings.

The apparatus further comprises a plurality of hose or tube fittings having the same or different sizes. Each of the fittings includes retainer means adapted to be engaged by a retainer, and stop means adapted to engage the plate in order to limit the extent of movement of the fitting into a hole of a plate. The distance from the retainer means to the stop means is the same for all sizes of fittings. The distance from the retainer means to the inner end of the fitting is preferably the same for all sizes of fittings.

A method in accordance with the invention comprises the steps of attaching a group of fittings to a sub-assembly, and connecting the sub-assembly to test apparatus.

A method in accordance with the invention further comprises the steps of attaching a second group of fittings to a second sub-assembly, connecting said second sub-assembly to test apparatus, disconnecting the two sub-assemblies from the test apparatus, and connecting the two sub-assemblies to a center connecting member which interconnects the two groups of fittings.

The foregoing and other objects and advantages of the present invention will become apparent from the following detailed description, taken in conjunction with the accompanying figures of the drawings, wherein:

FIG. 2 is an exploded perspective view of the apparatus illustrated in FIG. 1;

FIG. 9 is a view of an alternate form of the apparatus; and

FIG. 10 is a view of still another alternate form of the apparatus.

Figure 1:
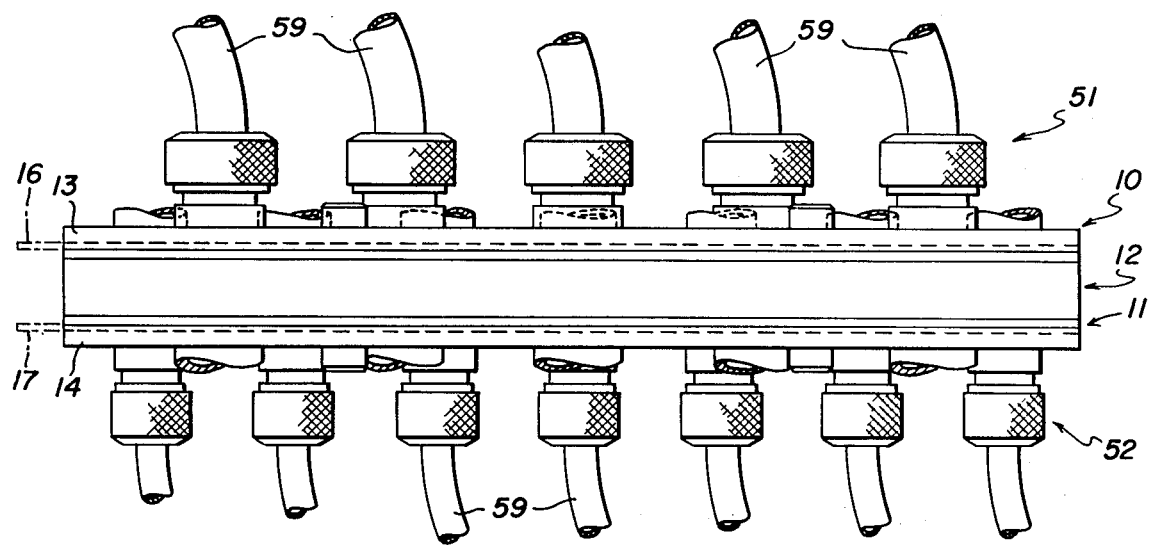
FIG. 1 is an elevational view illustrating apparatus for carrying out a method in accordance with the present invention.

While the invention is described herein in a specific application to the pneumatic systems of a truck, it should be understood that the invention also has uses in a variety of other fields and other fluid mediums. Throughout the present specification and claims, the use of the term "hose" is intended to cover the use of both various types of hose and/or various types of tubing. The invention is not limited to any particular type of hose or tubing.

With reference to FIGS. 1, 2, 4 and 6, the apparatus comprises two sub-assemblies 10 and 11 and a center connecting or manifold member 12. The sub-assemblies 10 and 11 respectively include plates 13 and 14 and slide retainers 16 and 17. In this embodiment of the invention, these parts are all rectangular, as shown in FIG. 2. The function of the retainers 16 and 17 is to releasably lock a plurality of hose fittings to the plates 13 and 14, and this function is accomplished making the retainers movable relative to the plates, between engaged positions and disengaged positions. In the engaged positions the retainers lock the fittings to the plates and in the disengaged positions the retainers permit the fittings to be assembled with or disassembled from the plates. The fittings are fastened in holes formed in the plates and passages in the center member 12 interconnect the fittings of the two sub-assemblies.

To movably fasten the retainer 16 to the plate 13, the plate 13 is provided with a recess 21 on its inner side, which is the side that faces the center member 12. The recess extends along the long dimension of the plate 13. The thickness of the recess 21 is slightly greater than the thickness of the retainer 16, and the width of the recess 21 is sized to slidably receive the retainer 16. The width of the recess 21 is less than the width of the plate 13, and consequently the recess 21 forms two thicker portions 18 and 19 (FIG. 7) which extend longitudinally of the plate 13 and border the recess 21. The retainer 16 is slidably or movably held in the recess 21 by a pair of screws 22 (FIGS. 6 and 7) each having a shank 23 threaded into a hole 20 in the plate 13, a shoulder 24, and an enlarged head 25. The retainer 16 has longitudinally elongated openings 27 (FIG. 2) which are sized to slidably receive the shoulders 24 of the screws 22. The direction of elongation of the slots 27 is in the direction of the length of the recess 21, and the diameter of the heads 25 of the screws 22 is greater than the width of the slots 27. The retainer 16 is assembled with the plate 13 by positioning the retainer 16 in recess 21, inserting the screws 22 through the slots 27, and screwing them into the threaded holes 20 of the plate 13. The heads 25 of the two screws 22 underlie the retainer 16 and hold the retainer assembled with the plate 13, but the retainer 16 is able to move, relative to the plate 13, in the recess 21, the amount of the movement being determined by the length of the elongated slots 27.

Figure 3:
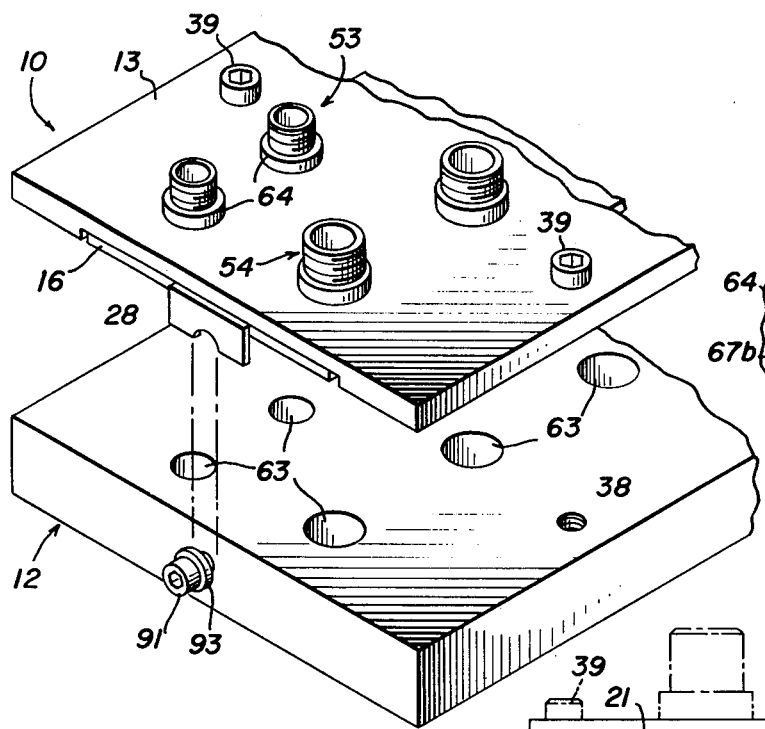
FIG. 3 is a fragmentary enlarged perspective view of a portion of the apparatus.
Figure 4:
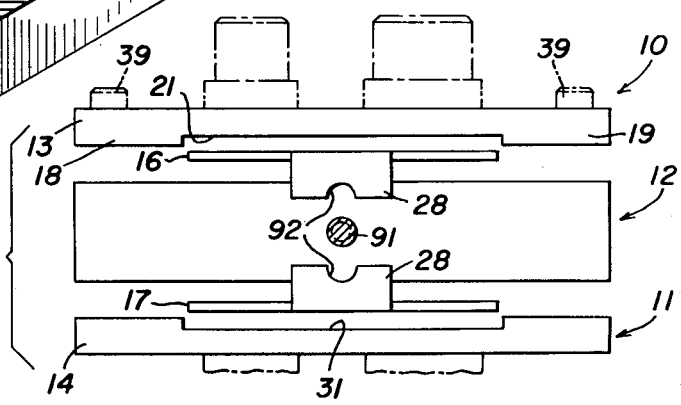
FIG. 4 is an exploded view of the apparatus.

As shown in FIGS. 3 and 4, an inwardly turned tab 28 is formed on one end of the retainer 16, which may be used for locking purposes and to permit an operator to grasp the retainer 16 as will be explained hereinafter.

The other sub-assembly 11 is constructed similarly to the sub-assembly 10. The plate 14 has a longitudinal recess 31 (FIGS. 2 and 4) formed therein which slidably receives the retainer 17, and a pair of screws 32 (FIG. 6) which slidably attaches the retainer 17 to the plate 14. The screws 32 each includes a threaded shank 33, a shoulder 34 and an enlarged head 35, the shoulders 34 of the two screws 32 being received in elongated slots or openings 37 and the shanks 33 being threaded into holes formed in the plate 14. Again, the direction of elongation of the slots 37 is in the direction of the recess 31. The enlarged heads 35 of the screws 32 hold the retainer 17 assembled with the plate 14, and the shoulders 35 are movable in the slots 37.

Figure 6:
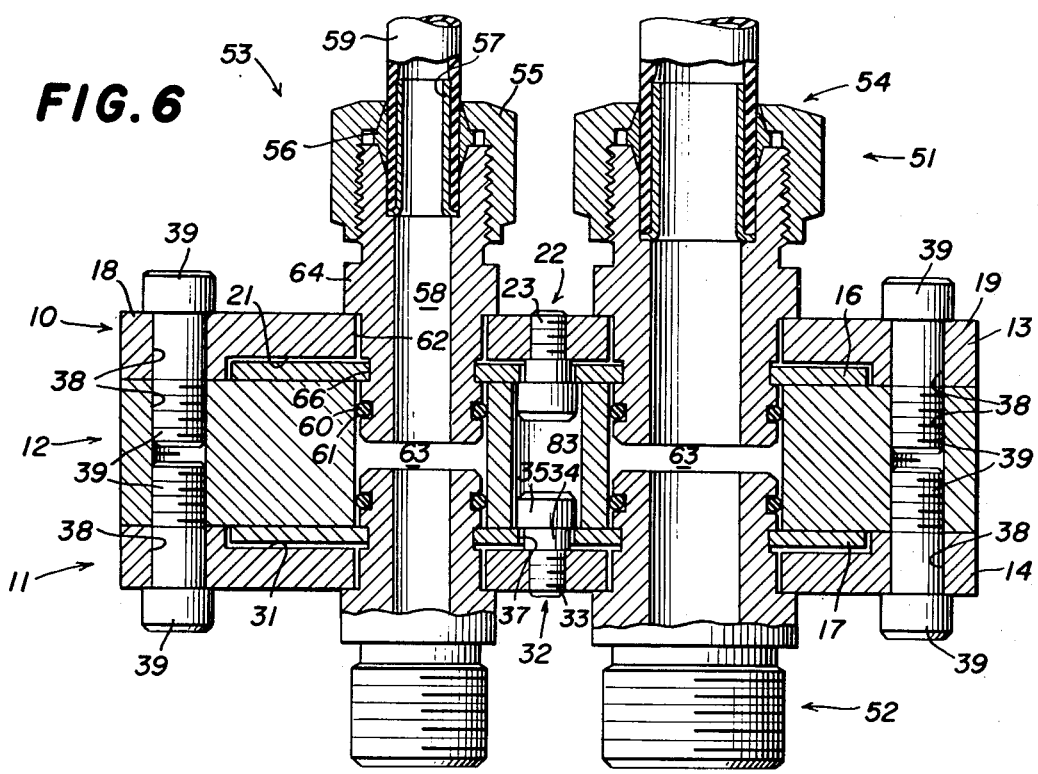
FIG. 6 is an enlarged sectional view of the apparatus.
Figure 7:
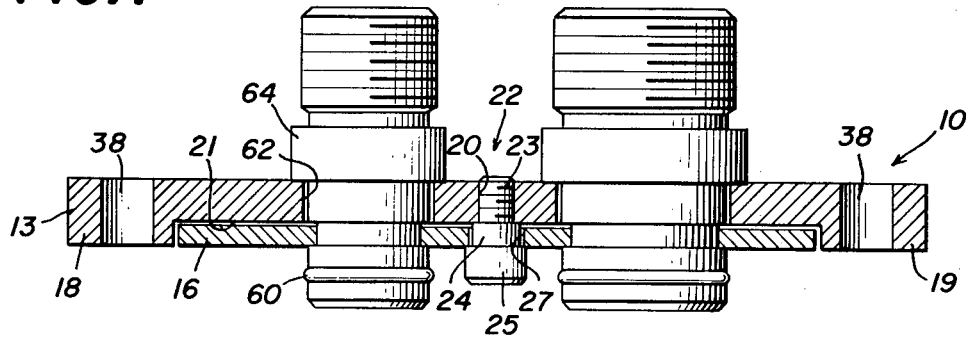
FIG. 7 is a sectional view of a sub-assembly of the apparatus.

The center connecting member 12 has, in the present illustration, substantially the same exterior dimensions as the two plates 13 and 14, and the center member 12 is relatively thick as shown in FIGS. 2-4, and 6. As shown in FIG. 6, the two sub-assemblies 10 and 11 are fastened to the center member 12 by placing the sub-assemblies 10 and 11 against the opposite broad sides of the center member 12 and screwing the parts together. Aligned holes 38 are formed in the two plates 13 and 14 and in the center member 12, and screws 39 are inserted through the holes 38 formed in the plates and threaded into the holes formed in the center member 12. As shown in FIGS. 6 and 7, the holes 38 are located in the thicker portions 18 and 19 outside of the recesses 21 and 31, so that the screws 39 cannot interfere with the retainers 16 and 17.

Associated with the sub-assembly 10 is a first group of hose fittings 51 (FIGS. 1, 2 and 6), and associated with the other sub-assembly 11 is a second group of hose fittings 52.

The group 51 of fittings includes two sets 53 and 54, the sizes, or diameters, of the fittings of the two sets 53 and 54 being different or sized as necessary. With specific reference to FIG. 6, each of the fittings of the set 53 is generally cylindrical and has a central fluid passage 58. The outer end of each fitting is secured to a flexible hose 59 by means of a nut 55, a sleeve 56 and a tubular insert 57. The insert 57 is disposed in the end of the hose 59 and the sleeve 56 is positioned around the hose and the insert. The outer surface of the sleeve has oppositely tapered surfaces which are tightly engaged by mating tapered surfaces of the fitting and the nut. When the nut 55 is tightly threaded on the fitting, the sleeve 56 is tightly compressed between the fitting, nut and hose, thus forming a fluid tight seal and holding the hose assembled with the fitting. It should be understood that the particular method of attaching the hose to the fitting does not form part of this invention and that other methods may be used.

The inner end or shank of each fitting of the set 53 is positioned through a hole 62 formed in the plate 13 and into a passage 63 formed in the center member 12. The portion of the fitting, which is received in the passage 63 includes an O-ring 60 (FIG. 8) positioned in an annular groove 61 in the outer periphery of the fitting, the O-ring 60 forming a seal between the fitting and the wall of the passage 63. Stop means in the form of a shoulder 64 is formed intermediate the ends of the fitting, the shoulder 64 being larger than the diameter of the hole 62 and engaging the outer surface of the plate 13.

Figure 5:
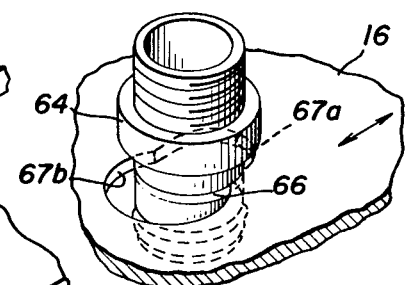
FIG. 5 is an enlarged fragmentary perspective view of a portion of the apparatus.
Figure 8:
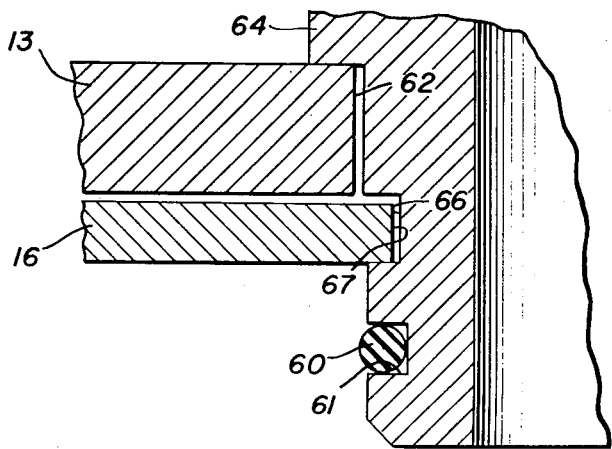
FIG. 8 is an enlarged fragmentary sectional view of a portion of the apparatus.

Retainer means in the form of an annular groove 66 is also formed on the shank of each of the fittings 53 between the groove 61 and the shoulder 64, which is engageable with the retainer 16. The retainer 16 has an opening 67 formed therein for each of the fittings 53 which is located adjacent each of the holes 62. Each of the openings 67 has an arcuate part 67a (FIG. 5) having a width which is slightly greater than that of the diameter of the base of the groove 66, and an enlarged portion 67b having a width which is slightly greater than that of the external diameter of the shank of the fitting. As shown in FIGS. 2 and 5, the portions 67a and 67b are connected or merge to produce an opening 67 which is elongated in the direction of the movement of the retainer 16. When the retainer 16 is moved to the maximum extent toward the right as seen in FIG. 2, the enlarged portions 67b of the openings 67 underlie the holes 62, and the shanks of the set 53 of fittings may be inserted through the holes 62 and the openings 67. As shown in FIGS. 6 and 8, the annular grooves 66 of the fittings 53 are in the plane of the retainer 16 when the shoulders 64 engage the outer surface of the plate 13. Consequently, when the retainer 16 is moved to the maximum extent toward the left as seen in FIGS. 2 and 5, the portions 67a of the openings 67 are moved into the grooves 66. As shown in FIG. 8, the width of the groove 66 is slightly greater than the thickness of the retainer 16, and the retainer engages the side of the groove 66 and prevents removal of the fitting. The position of the retainer 16 where it holds the fittings in place is referred to as its engaged position, and the other position of the retainer 16 where the enlarged portions 67b of the holes 67 are around the fittings, is referred to as its disengaged position.

It is preferred that the diameter of the portion of each fitting, from the groove 66 to the inner end thereof, be slightly less than the diameter of the portion of each fitting between the groove 66 and the shoulder 64 as shown in FIG. 8. With this construction, the inner ends of the fittings may be readily inserted through the holes 62 without the O-rings 60 engaging the margins of holes 62 as the fittings are assembled with the plate 13 and the retainer 16.

The fittings of the set 54 and the fittings of the group 52 are constructed similarly to the fittings of the set 53. Each of the other fittings includes sealing means in the form of an O-ring located in an annular groove, retainer means in the form of an annular groove formed in the shank of the fitting in the plane of the retainer 16 or 17, and stop means in the form of an enlarged shoulder. The distance from the groove 66 to the inner surface of the shoulder 64, which engages the outer surface of the plate 13, is the same for all of the fittings even though the fittings of the various sets have different sizes. This is important because the retainer grooves 66 for all fittings of a group, regardless of size, will be aligned with the associated retainer when the shoulders 64 are engaged with the outer surface of the plate 13. Further, the distance from the groove 66 to the inner end of each fitting is also the same for all the sizes of fittings. This is important because after the group 51 of fittings, for example, has been assembled with the plate 13 and the retainer 16, the entire sub-assembly 10 may be assembled with the center member 12 and the inner ends of all of the fittings will enter the passages 63 of the center member 12 simultaneously, thereby preventing tilting of the sub-assembly during assembly with the center member.

The center member 12 has a passage 63 formed therein for each of the fittings of the group 51, each of the passages being aligned with a hole 62 and an opening 67. With reference to FIGS. 2 and 6, the diameters of the passages 63 are different, depending upon the size of the associated fitting. Each of the passages 63 is sized so that its wall makes sealing contact with the O-ring 60 of the associated fitting. As shown in FIG. 6, the passages 63 extend entirely through the center member 12, from its upper side to its lower side. When the two sub-assemblies 10 and 11 are secured to the center member 12, the inner ends of the fittings of the two groups 51 and 52 are connected to opposite ends of the passages 63, so that each fitting of the group 51 is in fluid communication with an associated fitting of the group 52.

As shown in FIG. 6 and as previously mentioned, the holes 38 in the center member 12 for the screws 39, extend entirely through the center member and are threaded at both ends, in order for the screws to secure the plates 13 and 14 to opposite sides of the center member 12. It should be understood that the same action could be accomplished by one bolt extending through plates 13 and 14 and center member 12 and secure it with a nut, thus eliminating the need for threaded portion of hole 38 in center member 12. To provide clearance for the heads of the screws 22 and 32, holes 83 (FIGS. 2 and 6) are formed through the center member 12 in registry with the screws 22 and 32. The diameter of the holes 83 is of course greater than that of the heads of the screws 22 and 32 so that the heads may be received in opposite ends of the holes 83.

The hose and fittings of the groups 51 and 52 are separately connected in different parts of the pneumatic systems of the truck. The group 51 may be in the part of the systems on the truck body and the group 52 may be in the part of the systems on the engine and frame. The group 51 of fittings is assembled with the plate 13 and the retainer 16 by moving the retainer 16 to the disengaged position (dashed lines in FIG. 1) and inserting the fittings through the holes 62 and openings 67. With the shoulders 64 engaging the outer surface of the plate 13, the retainer 16 is manually shifted to the engaged position where the portions 67a of the openings 67 engage the grooves 66 of the fittings. The ends of the slots 27 are preferably located to stop the retainers at exactly the engaged and disengaged positions. Similarly, the fittings of the group 52 are assembled with the sub-assembly 11 including the plate 14 and the retainer 17.

Once the group 51 of fittings has been assembled with the plate 13 and the retainer 16, the complete sub-assembly 10 may be used to pressure test the parts of the pneumatic systems associated with the group 51. The sub-assembly 10 may be connected to a test stand (not shown) having passages similar to the passages 63, which receive the inner ends of the fittings. Conventional pressure testing techniques may be used to pressure test the parts of the pneumatic systems connected to the fittings, and any repairs or adjustments may be made. Similarly, the parts of the pneumatic systems associated with the group 52 of fittings may be separately pressure tested on another test stand simply by connecting the complete sub-assembly 11 to the test stand.

After the two parts of the systems have been separately pressure tested and disconnected from the test stands, the body of the truck is assembled with the frame of the truck and the two parts of the pneumatic systems are connected to form complete systems simply by attaching the sub-assembly 10 to the center member 12 using the screws 39, and by attaching the other sub-assembly 11 to the other side of the center member 12 using the screws 39. The two parts of the pneumatic systems are then connected by the passages 63 to form the complete systems. To attach a sub-assembly to the center member 12, the sub-assembly and the member 12 are moved together to bring the inner ends of the fittings into the passages 63. Since all of the fittings have the same length regardless of the diameter size, the ends of the fittings will simultaneously enter the passages without tilting or cocking of the sub-assembly. The plate is then pushed tightly against the center member and the screws are used to secure the parts together.

Since the thickness of the recesses 21 and 31 is slightly greater than the thickness of the retainers 16 and 17, the retainers may be moved after final assembly so that one or a number of the fittings may be removed and later replaced. Consequently, the fittings may be individually removed or installed, and time is saved in assembling the parts because the fittings may be gang assembled. Even though the retainers may be moved, they cannot become displaced from the other parts and lost because the screws 22 and 32 prevent complete removal. Since a sub-assembly is attached to the center member 12 separately from the attachment of the other sub-assembly, either sub-assembly may be removed from the center member for servicing without disturbing the other sub-assembly.

The two retainers 16 and 17 may be locked in their engaged positions by a screw 91 (FIGS. 3 and 4) which is threaded into a hole formed in an end of the center member 12 adjacent the tabs 28 formed on the two retainers 16 and 17. Each of the tabs 28 has an arcuate cut-out 92 formed therein and the cut-outs 92 are located to extend closely adjacent the shank of the screw 91 when the parts are assembled. The screw 91 has an enlarged flange 93 which extends over the outer surfaces of the tabs 28 and thereby prevents the tabs 28 from being moved toward the left as seen in FIG. 3.

At the other end of the apparatus, arcuate cut-outs 94 (FIG. 2) may be formed in the two plates 13 and 14 and an arcuate cut-out 96 may be formed in the center member 12, the three cut-outs 94 and 96 being in alignment. The cut-outs 94 and 96 expose parts of the ends of the retainers 16 and 17 when the retainers are in their engaged positions, and thus provide finger space so that, when the screw 91 is loosened, the two retainers 16 and 17 may be pushed toward the right as seen in FIG. 2 to move the retainers from the engaged position to their disengaged position in order to release the fittings from the two sub-assemblies. The tabs 28 may also be used to grasp the retainers and pull or push the retainers.

As an extra measure of safety, aligned holes 98 (FIG. 2) may be formed in the two plates 13 and 14, the retainers 16 and 17 and the center member 12, the holes being aligned when the retainers are in their engaged positions, so that a nut and bolt combination (not shown) may be disposed in the holes 98 in order to secure the parts together and to positively prevent the retainers from moving to their disengaged positions.

FIGS. 9 and 10 illustrate other configurations in accordance with the invention. In FIG. 9, a first sub-assembly 101 and a second sub-assembly 102 are attached to a center member 103. The two sub-assemblies 101 and 102 may have the same construction as the sub-assemblies 10 and 11, and have groups 104 and 105 of fittings attached thereto.

The center member 103 has two sides 107 and 108 which connect to the sub-assemblies 101 and 102, the sides 107 and 108 forming a 45° angle between them. Screws 109 secure the sub-assemblies to the member 103. A plurality of passages 111 are formed in the member 103 between the sides 107 and 108, which receive the fittings of the groups 104 and 105. It will be apparent that the FIG. 9 apparatus is essentially the same as that of FIGS. 1 to 8 except for the shape of the center members.

FIG. 10 shows an arrangement where four sub-assemblies 116, 117, 118 and 119 are secured to a hexagonal center member 121. The sub-assemblies 116 to 119 are respectively attached to four sides 122 to 125 of the center member 121, and they each have a construction similar to that previously described. The center member 121 has a first set of passages 127 extending between the sides 122 and 124 and connecting the fittings of the sub-assemblies 116 and 118, and a second set of passages 128 extending between the sides 123 and 125 and connecting the passages of the sub-assemblies 117 and 119. The passages 127 are offset from and do not intersect the passages of the set 128.

While FIG. 10 illustrates a convenient means of using four sub-assemblies with a single center member, the member 121 may be used with only two sub-assemblies, or a total of six sub-assemblies could be used by utilizing the other two sides 129 and 130 and forming another set of passages, offset from the passages 127 and 128, between the sides 129 and 130.

It should be obvious that still other configurations may be devised. For example, two spaced sub-assemblies may be attached to a single surface of a center member, and passages may be formed in the center member between the two spaced sub-assemblies. Two fittings of a single set, such as the two fittings of the set 105 shown in FIG. 9, may be connected to opposite ends of a single length of hose and thereby interconnect the two fittings at the opposite ends of the passages, such as the fittings of the set 104, or a special manifold member may be used to connect adjacent passages. Such a manifold would have parts constructed the same as the inner ends of the fittings so that it could take the place of two fittings. Instead of using such a manifold, another passage, illustrated by a passage 132 in FIG. 10, may be formed in the member 121 and intersect the two passages 128. A plug or cap 133 may be used to seal the outer end of the passage 132. As previously mentioned, the sub-assemblies of the different forms of the invention may be identical, and therefore a single sub-assembly may be used with different center members. While the parts of the sub-assemblies and the center members are illustrated as being made of metal, it is obvious that they could be made of other materials such as a tough plastic. While only two sizes of fittings have been shown in a group, additional sizes could readily be provided, or only two sizes may be used and adaptors utilized to make connections to other hose sizes.

We claim:

1. A method of assembling two or more groups of fittings utilizing a center connecting member having a plurality of passages formed therethrough, comprising the steps of releasably attaching one of said groups to a first sub-assembly, releasably attaching another of said groups to a second sub-assembly, moving said groups of fittings into opposite ends of the passages and said first and second sub-assemblies into engagement with said center connecting member, and securing said sub-assemblies and said members together.

2. A method of assembling a group of fittings employing a sub-assembly and a member, said sub-assembly including first and second relatively movable means, and said member having a plurality of passages therein, said method comprising the steps of moving said second means relative to said first means to form a plurality of openings therein, each opening being large enough to receive a fitting, positioning said group of fittings in said openings, moving said second means relative to said first means to engage said fittings and to hold said fittings in assembled relation therewith, moving said sub-assembly and said member together to position said fittings in said passages, and attaching said sub-assembly to said member.

3. A method of assembling and testing parts of systems including two or more groups of fittings, comprising the steps of connecting one of said groups of fittings in one part of a system, connecting a second of said groups in a second part of the system, attaching all of said fittings of said one group to a first sub-assembly, attaching all of said fittings of said second group to a second sub-assembly, attaching said first sub-assembly to test apparatus and pressure testing said one part of said system, attaching said second sub-assembly to test apparatus and pressure testing said second part of the system, disconnecting said sub-assemblies from said test apparatuses, and securing said first and second sub-assemblies to a center connecting member and thereby connecting said parts of said system.

4. A method of testing a plurality of hydraulic and/or pneumatic systems comprising the steps of connecting a hose and fitting assembly into each of the systems, attaching all of said fittings of said group to a sub-assembly, attaching said sub-assembly to test apparatus and pressure testing said systems, and disconnecting said sub-assembly from said test apparatus.

5. A method according to claim 4, and further including the step of connecting said sub-assembly to another sub-assembly of another plurality of systems.

6. A method of assembling a group of fittings with a member utilizing a sub-assembly having a plurality of openings and relatively movable parts for interengaging with the fittings, and said member having a plurality of passages therein sized to receive the fittings, said method comprising the steps of moving said fittings into said plurality of openings, moving said parts relative to each other to engage said fittings and to releasably hold said fittings in assembled relation therewith, moving said sub-assembly with said fittings attached thereto and said member together to position said fittings in said passages in sealed relation therewith, and releasably attaching said sub-assembly to said member.

7. A method according to claim 6, wherein said member forms part of test apparatus, and further including the steps of connecting said fittings using hose to a plurality of hydraulic and/or pneumatic systems, testing said systems utilizing said test apparatus, and disconnecting said sub-assembly from said member at the completion of said tests.

8. A method according to claim 6, wherein said member forms a center manifold, and further including the step of moving a second sub-assembly with fittings attached thereto and said member together to position said fittings in said passages in sealed relation therewith, and releasably attaching said second sub-assembly to said member.

* * * * *